Aug. 8, 1933.  W. S. THOMPSON  1,921,594
PLY STRETCHING APPARATUS
Filed March 17, 1928   2 Sheets-Sheet 1
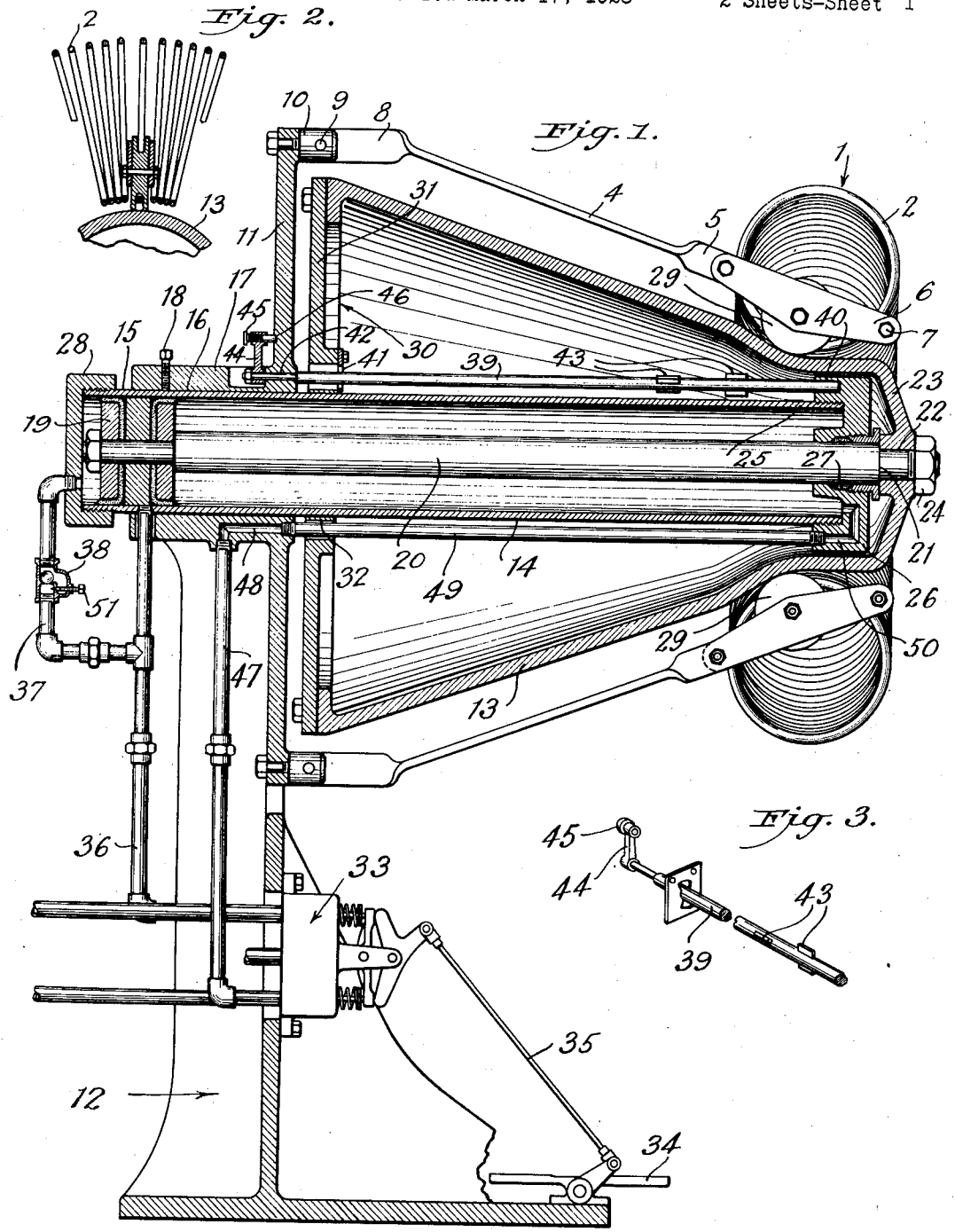
INVENTOR
Walter S. Thompson
BY
Ernest H. Hofmann
ATTORNEY Aug. 8, 1933.  W. S. THOMPSON  1,921,594
PLY STRETCHING APPARATUS
Filed March 17, 1928   2 Sheets-Sheet 2
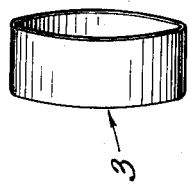
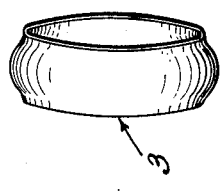
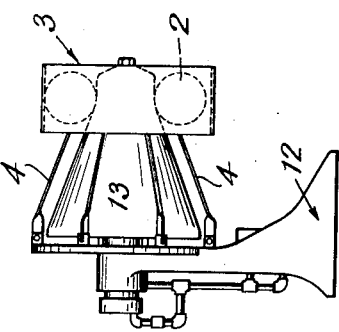
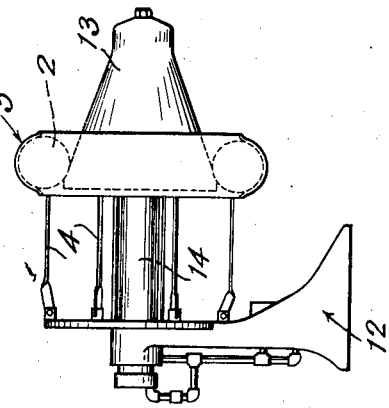
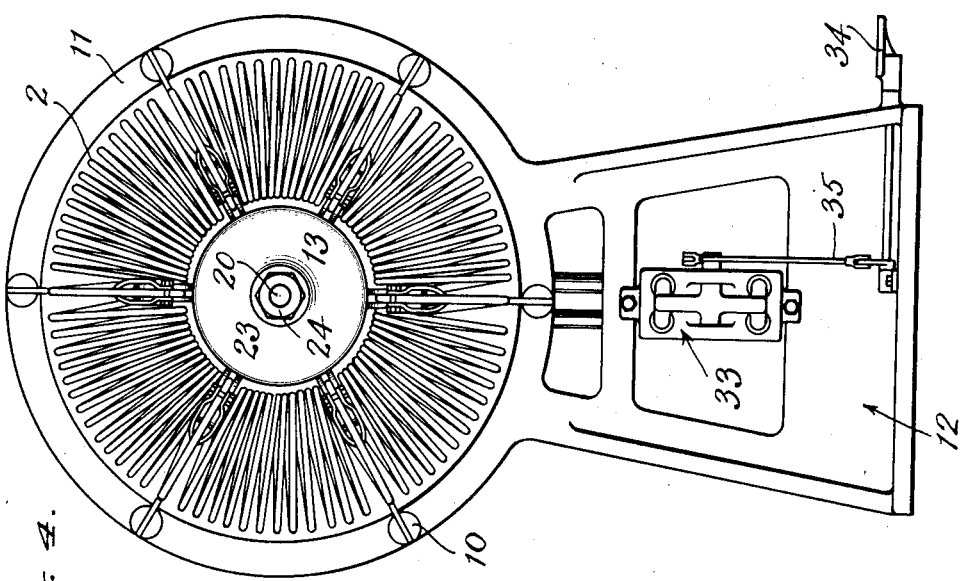
INVENTOR
Walter S. Thompson
BY
ATTORNEY Patented Aug. 8, 1933

1,921,594

UNITED STATES PATENT OFFICE 1,921,594

PLY STRETCHING APPARATUS

Walter S. Thompson, Detroit, Mich., assignor to Morgan & Wright, Detroit, Mich., a Corporation of Michigan Application March 17, 1928. Serial No. 262,548

5 Claims. (Cl. 154—10)

This invention is concerned with mechanism for facilitating the manufacture of pneumatic tire casings constructed by the core method, and particularly to apparatus for stretching or reshaping "tire-bands", (flat or crowned) prior to placing them on cores for final forming to tire shape.

In order to effect a more uniform distribution of the tire stock, and to prevent crowding thereof at the side walls when the tire-band is undergoing the process of final formation to tire shape on the core, it has been the general practice to make the tire-bands smaller in circumference than the peripheral length of the finished tire, then to stretch this relatively small tire-band in a manner to increase its circumference and thereby effect such rearrangement of spacing of its components that when the tire-band is placed on the core for final forming to tire shape, the desirable stock distribution will be maintained and crowding at the side walls eliminated.

Heretofore, the stretching has been done by hand. This required a considerable amount of labor and usually resulted in the tire-band being applied to the forming core in distorted condition due to the unevenness of hand stretching.

One of the objects of this invention is to overcome the foregoing objections by providing means for effecting even stretching of the tire-band so that it will be uniform in shape. In accomplishing this purpose, the tire-band is placed on an expansible device which is operable to effect radial expansion uniformly at all portions of the tire band material and to impart thereto a curved cross section whereby the material is more easily adjustable for undergoing final forming to tire shape.

Another object is to provide means for holding the tire band expanded for a predetermined period so as to insure retention or a proper degree of stretching. All of the materials whether fabric, cords, or rubber stock, may be applied to the expansible device for stretching.

Another object is to provide means for adjusting the amount of expansion of the stretching element to compensate for various degrees of stretching required. Other features and advantages will appear as the description proceeds.

Referring to the accompanying drawings forming a part of this specification;

Fig. 1 is a vertical section through the tire stretching machine;

Fig. 2 is a fragmental detail of the stretching element;

Fig. 3 is a perspective detail of a device for adjusting the machine for different expansions;

Fig. 4 is a front elevation of the machine;

Fig. 5 is a side elevation with the tire band in position before stretching;

Fig. 6 is a similar view with the tire band stretched;

Fig. 7 is a view of a flat tire band; and

Fig. 8 is a view of the tire band after undergoing the process of stretching and reshaping.

Referring to the drawings, which are merely illustrative of one embodiment of the invention, reference numeral 1 indicates generally an expansible stretching device preferably in the form of a ring of coiled spring material having convolutions 2 which are adapted to receive, for stretching, a tire-band (flat or crowned), such as indicated by the numeral 3 in Fig. 5. A series of arms 4 include flat portions 5 and clamping plates 6 which are secured together by means of fasteners 7 in a manner to grip the convolutions 2 at intervals around the ring 1 and thereby hold the same to the arms 4. The other ends of the arms 4 may also be formed with flat portions 8, each pivoted at 9 to studs 10 suitably fastened to the upper portion 11 of a frame indicated generally by the numeral 12. The arms 4 are adapted to hold the ring 1 in position while an expanding element preferably in the form of a cone 13 is forced through the opening of the ring 1 to effect a spreading or expansion of said ring radially in all directions and thereby cause stretching and reshaping of the flat or crowned tire-band 3 to an increased peripheral length and a curved cross-section, preferably with flared side portions, as exemplified in Fig. 6. For imparting motion to the cone 13, in order to expand the ring 1, there is provided a cylinder 14 disposed axially within the cone 13 and having one end thereof 15 secured within the bore 16 of an extension 17 associated with the upper portion 11 of the frame 12, a set screw 18 being threaded into the extension 17 to hold the cylinder in position. A suitable piston 19 slidable within the cylinder 14 is carried at one end of a piston rod 20, the opposite end of which may be reduced as indicated at 21 and received through a perforation 22 in the reduced or outer end 23 of the cone 13, a nut 24 being provided for securing the piston to the end 23. The end of the cylinder 14 extending within the cone 13 is designated 25 and is provided with a head 26 and a stuffing box 27 for keeping that end of the cylinder pressure tight around the piston rod 20. The opposite end 15 of the cylinder 14 is provided with a head 28.

The piston 19 is adapted to be propelled by a suitable fluid under pressure, whereby to cause traverse of said piston in one direction to thrust the inclined walls of the cone 13 through the expansible ring 1, or in the opposite direction to withdraw the cone. For obviating friction and facilitating the operation of effecting such expansion of the ring 1, the arms 4 are equipped with rollers 29 which ride upon the inclined walls of the cone 13. The enlarged end 30 of the cone 13 is supported by an annular plate 31 having a central opening 32 arranged in sliding contact with the outer surface of the cylinder 14. The outer end of the cone, that is the reduced end 23, is therefore supported by the piston rod 20 and the cylinder 14, and the enlarged end 30 is also supported by the cylinder 14 through the medium of the plate 31 during motion of the cone in the direction to expand the ring 1 to stretch the tire-band 3, or to withdraw the cone by a reverse operation of the piston 19, whereby the ring 1 collapses to permit the stretched tire-band to be removed and a new one placed in position thereon.

Any suitable means may be employed for applying and controlling the fluid pressure for operating the cone 13. One suitable form of controlling device is that known commercially as the Ross operating valve illustrated generally at 33. This valve is operated by a two-way treadle 34 to which it may be connected through the medium of a rod 35. By pressing on the treadle in one direction, the valve 33 permits the pressure fluid to pass through pipe 36, branch connection 37, the check-valve 38 and thence between the head 28 and the piston 19, thereby causing the piston to move the cone outward in ring expanding direction. It will be noted that the upper end of the pipe 36 communicates directly with the cylinder 14 and that it is normally sealed by the piston 19. However, after the piston 19 passes beyond the opening of the pipe 36 the pressure fluid may enter the cylinder 14 through the pipe 36 and does not thereafter depend upon the branch connection 37. Suitable means are provided for limiting the travel of the cone 13 in order to control the amount of expansion of the ring 1 and thereby the degree of stretching of the tire-band 3. In the present example of the invention, there is illustrated for this purpose a rod 39 journaled at one end 40 in the head 26, and at the other end passing through a clearance perforation 41 in the plate 31 and thence through a journal perforation 42 in the upper portion 11 of the frame 12. A pair of stops 43 are fastened to the rod adjacent the outer end of the cone travel and the rod 39 may be turned about its axis to present either of the stops 43 to the advancing plate 31 so as to meet the same and thereby limit its outward travel. An arm 44 secured to the outer end of the rod 39 may be provided with a detent pin 45 for engaging notches 46 within the portion 11 thereby providing means for setting the stops 43.

After the cone 13 has been projected outward to effect expansion of the ring 1 and brought to position against one of the stops 43, it may be allowed to remain in such extended position in order to insure the proper degree of expansion of the tire-band 3 and that it shall retain such expansion after it is removed for further operations. For returning the cone 13 to non-expanding position, that is, to withdraw it from the ring 1, the treadle 34 is operated in the reverse direction, whereupon the valve 33 permits the fluid to enter the pipe 47 then through a passage 48, into a pipe 49, then through a passage 50 and into the end 25 of the cylinder 14, whereby the fluid pressure is exerted against the opposite side of the piston 19 to cause it to return toward the head 28. In the meantime, the valve 33 has opened exhaust passages to permit exhaustion of the fluid at the non-pressure side of the piston 19 through the pipe 36, the check valve 38 closing escape through branch pipe 37. This return travel of the piston continues until said piston reaches and seals the upper end of the pipe 36 through which the non-pressure side of the cylinder 14 was exhausting. After the piston 19 seals this passage, the remaining fluid between the piston and the head 28 provides a cushion to absorb any shock caused by the returning piston and the cone 13. The cushioning fluid is allowed to escape through pipes 37 and 36 to the exhaust port, but it must first pass through a slow-release valve 51 associated with the branch pipe 37, so as to insure return of the cone 13 to normal position without shock.

It will be readily seen that tire-bands, either flat or crowned in cross section, may be quickly applied to the machine and stretched radially in all directions to increase the diameter or peripheral length of the band, and also to impart thereto a curved cross section. This stretching and reshaping materially aids in forming the tire-band into tire shape on a core, and, due to the expansion from a relatively small sized tire-band to a larger one, the components either fabric, cord or rubber stock, undergo a rearrangement, for instance, the cords are spread a little further apart or the fabric is stretched a certain amount at this operation so that when the final forming operation takes place on the core, the stock is properly distributed for formation to tire shape and there is no crowding of the cords, fabric or rubber stock at the side walls of the casing.

Having thus described my invention, what I claim and desire to protect by Letters Patent is:

1. A stretching apparatus, including an element comprising a coiled spring arranged in the form of a ring and adapted to receive a tire-band, a cone, means operable to move said cone through the ring-opening in a direction to expand the ring radially outward, said means being also operable to return said cone to non-expanding position, and means for cushioning said cone on the return operation thereof.

2. A stretching apparatus, including a stretching element comprising a coiled spring arranged in the form of a ring adapted to receive a tire-band, a cone, means operative to move said cone through the ring-opening in a direction to expand said ring radially outward in all directions, stop devices for predetermining the ring-expanding travel of the cone, said cone operating means being also effective to return said cone to non-expanding position, and means for cushioning said cone on its return travel.

3. A stretching apparatus, comprising a coiled spring arranged in the form of a ring and adapted to receive a tire-band, a frame, a series of arms movably connecting said ring to the frame, a cone movably carried by said frame, fluid pressure devices operable to cause projection of said cone through said ring opening to expand the ring radially in all directions, while the arms hold the ring in position, and adjustable means for limiting the travel of said cone in ring-expanding direction, said fluid pressure devices being also arranged to effect a return of said cone to non-expanding position and to cushion the action thereof during said return.

4. A stretching machine, comprising an expansible ring adapted to receive a tire-band, an expander comprising a cone-shaped element having its reduced end entering the ring opening, a piston-rod secured to the reduced end of the cone and carrying a piston, a frame, a cylinder fastened to the frame and in which the piston travels, said piston-rod and the cylinder extending axially within said cone, a support carried adjacent the large end of the cone and having an aperture adapted to be received on the outside of the cylinder in sliding relation, said cylinder being closed at both ends, a source of fluid pressure, fluid-conveying connections from said source to both ends of the cylinder, valve mechanism operable to permit said fluid to enter at one end of the cylinder to thereby cause travel of the piston in a direction so as to thrust the enlarged portion of the cone into the ring opening to effect expansion of the ring, or to enter the other end of said cylinder to cause withdrawal of said cone from the ring, and means for limiting the travel of the cone in ring-expanding direction to predetermine the amount of stretch imparted to the tire-band, said limiting means being adjustable to vary the degree of stretching.

5. A stretching apparatus, comprising a coiled spring arranged in the form of a ring adapted to receive a tire-band, a cone having its small end normally engaged in the opening of said ring whereby to support the same, a cylinder, a piston-rod secured to said cone and carrying a piston arranged to slide in the cylinder, said piston-rod and the cylinder being arranged to support said cone, a source of fluid pressure, pressure-conveying passages connecting said source to both ends of the cylinder, valve mechanism for controlling said fluid pressure in a manner to cause projection of said cone through the ring opening to effect expansion of the ring or to withdraw said cone to permit collapse of the ring to normal size, said valve being arranged to allow said cylinder to exhaust through said passages on the non-pressure side of the piston during either stroke thereof, said passages being also arranged to retard said exhaust adjacent the end of the piston travel in cone-withdrawing direction, whereby to cushion the action of said cone at the withdrawing operation.

WALTER S. THOMPSON.